Patented Jan. 19, 1943

2,308,594

UNITED STATES PATENT OFFICE 2,308,594

MANUFACTURE OF ALIPHATIC COMPOUNDS

Henry Dreyfus, London, England, assignor to Celanese Corporation of America, a corporation of Delaware No Drawing. Application February 23, 1940, Serial No. 320,425. In Great Britain December 21, 1939.

5 Claims. (Cl. 260—546)

This invention relates to the manufacture of aliphatic compounds by subjecting carbon monoxide to reaction with an aliphatic alcohol.

I have now found that basic nitrogen compounds exert a favorable influence on the yield of aliphatic compounds obtained by reaction between carbon monoxide and an aliphatic alcohol when a phosphorus oxy-acid catalyst is used. I have further found that it is not necessary that the basic nitrogen compound should be present throughout the whole of the reaction zone and that beneficial results accrue even when the basic nitrogen compound is only introduced into the substances leaving the reaction zone.

According to the invention therefore, in subjecting carbon monoxide to reaction with an aliphatic alcohol in presence of a phosphorus oxy-acid catalyst, a basic nitrogen compound is introduced into the reaction zone or into the substances issuing therefrom.

In practice it is preferred to disperse the catalyst in the reaction zone in the gaseous phase by introducing into the reactants a phosphorus oxy-acid or a compound yielding the same under reaction conditions and to introduce the basic nitrogen compound into the reactants at the same or a later point with respect to the flow thereof, or into the substances issuing from the reaction zone. It is desirable to introduce the phosphorus compound into the reactants as they enter or are about to enter the reaction zone. The nitrogen compound may be introduced at more than one point, e. g., some may be supplied at or near the point of introduction of the catalyst and an additional supply introduced into the substances issuing or about to issue from the reaction zone.

As indicated the catalyst is a phosphorus oxy-acid, e. g., ortho-phophoric acid, or a compound yielding such an acid under reaction conditions, e. g., methyl, ethyl or other alkyl ester of ortho-phosphoric acid.

Basic nitrogen compounds of particular value are ammonia primary, secondary and tertiary alkyl bases, e. g., ethylamine and diethylamine, tetra-alkylammonium bases, and aniline, pyridine, quinoline and other aryl bases. In addition basic derivatives of carbamic acid or of glycine may be employed, e. g. urea, the urethanes (i. e., esters of carbamic acid), glycinamide, glycine esters and the N-methyl, N-ethyl and other N-alkyl substituted products of these compounds, and also acidylated basic derivatives of the amino-carboxylic acids.

The process may be carried out by passing a mixture of carbon monoxide and methyl alcohol vapor containing the desired catalyst dispersed therein through tubes or other apparatus heated to a suitable temperature. In general the temperature employed should be above 250° C., for instance 300–350° C., although higher temperatures, e. g., up to 450° C., may be employed if desired. The starting materials may be subjected to preheating before being introduced into the reaction zone. The process may be carried out under high pressure, for instance, pressures in excess of 50 atmospheres, e. g., 100 to 200 atmospheres. The invention is not limited in this respect, however, and even higher pressures, e. g., 400 or more atmospheres, or lower pressures down to atmospheric pressure or below, may be used if desired.

The reaction zone should be made of or lined with a material which resists corrosion or which does not produce as a result of corrosion any substances liable to affect deleteriously the reaction. Copper may be employed since the presence of traces of copper compounds is beneficial in the process while the presence together of traces of both copper compounds and silver compounds is even more effective in promoting the reaction. Thus the reaction may be carried out in a tube containing a filling of copper, e. g., in the form of turnings or gauze, to which filling of silver compound has been applied or which has been plated, preferably upon part only of its surface, with silver. The use of a metal filling offers the advantage of assisting the attainment of uniform heating of the starting material. If desired the reaction vessel may be constructed of or lined with a material having substantially no effect of any sort on the reaction, for instance it may be plated with gold.

Where a volatile phosphorus compound is employed it may be introduced into the starting materials in vapor form. For instance, carbon monoxide may be passed first through a vaporiser containing an alcohol and maintained at a temperature such that the desired quantity of the alcohol is picked up as vapor by the carbon monoxide, and then through a second vaporiser containing the phosphorus compound and maintained at a temperature such that the carbon monoxide-alcohol vapor mixture takes up the desired quantity of the phosphorus compound. Alternatively the phosphorus compound, whether or not it is volatile, may be injected, in the form of a solution, e. g., in water, acetic acid or methanol, into the reactant mixture being supplied to the reaction zone.

Likewise the nitrogen compound may be introduced into the reaction zone or into the substances issuing therefrom as a solution in a suitable solvent, e. g., acetic acid. Where the phosphorus and nitrogen compounds employed are not reactive towards each other they may be employed in admixture or in solution in a common solvent.

Quite small amounts of the phosphorus compound and likewise of the nitrogen compound are sufficient to produce a beneficial effect in the process, for instance 0.1–0.5% of the weight of the alcohol employed, but larger quantities, e. g., up to 1 or 2% of the weight of the alcohol may be used if desired.

The invention is of especial importance in connection with the reaction between methyl alcohol and carbon monoxide which is usually conducted with the object of obtaining acetic acid as the sole or main product, although the acetic acid is usually recovered partly in the form of methyl acetate and can, if desired, be obtained wholly in this form. The presence of water vapor in the starting material favors the production of the free acid, quantities of water vapor equal to one half to twice the volume of methyl alcohol vapor being very suitable. Where it is desired to produce a high yield of free acetic acid the methyl acetate, and dimethyl ether which may also be present in the reaction products, may be returned to the process and used as starting material in place of methyl alcohol. From the point of view of producing free acetic acid, a larger proportion of water vapor is desirable in the starting materials when, apart from the carbon monoxide, they consist largely of methyl acetate and/or dimethyl ether than is the case when methyl alcohol only is present.

The invention is not, however, limited to the production from carbon monoxide and methyl alcohol of acetic acid and/or methyl acetate. It would appear that the production of these compounds involves the formation, possibly as intermediates, of ketene and acetic anhydride and, if desired, steps may be taken to recover these compounds as end-products of the process. For instance the substances leaving the reaction zone may be subjected to a treatment whereby acetic anhydride contained therein is condensed while more volatile materials (including any water present) pass on and are condensed separately after which ketene can be scrubbed from uncondensed gas, for instance with acetone to dissolve the ketene or with acetic acid to form acetic anhydride. Such a process can be facilitated when water is present by the use of liquids forming azeotropic mixtures with water, e. g., benzene, toluene, xylene or chlorbenzene. Alternatively the reaction products may be condensed in presence of a liquid which dissolves acetic anhydride but has little or no solvent action on water so that condensation of the anhydride and its separation from water present takes place simultaneously; such a liquid may be, for instance, benzene or chloroform.

In the manufacture of ketene or acetic anhydride the phosphorus and nitrogen compounds may be employed in chemical combination, e. g., in the form of an ammonium or an N-substituted ammonium salt of a phosphorus oxy-acid, a partially amidated phosphorus oxy-acid or an ester thereof or a fully amidated phosphorus oxy-acid. When this is the case a basic nitrogen compound may be used in addition; thus the nitrogen-phosphorus compound may be dispersed in the reaction zone in the gaseous phase and the basic nitrogen compound dispersed in the substances issuing from the reaction zone.

Finally, it is to be understood that the invention may be applied to the reaction between carbon monoxide and alcohols other than methyl alcohol, e. g., ethyl alcohol.

The following examples illustrate the process of the invention:

*Example 1*

Methyl alcohol vapor and water vapor are introduced into a current of carbon monoxide by passage thereof at a pressure of 150 atmospheres successively through two vaporisers, the first containing methyl alcohol and the second water. The mixture thus obtained is preheated to about 325° C. and then passed via a catchpot into a copper reaction tube maintained at a temperature of 300–320° C. Into the catchpot there is sprayed a 10% solution of ortho-phosphoric acid in water and also an 8% solution of ethylamine in water, the solutions being injected in such quantities that the gas stream picks up about 0.15% of the phosphoric acid and about 0.12% of ethylamine based on the weight of methyl alcohol passing.

The products are cooled and condensed and subjected to distillation to separate the acetic acid and methyl acetate formed.

*Example 2*

A mixture of methyl alcohol vapor and water vapor at atmospheric pressure is preheated to about 325° C. and then passed in a rapid stream via a catchpot into a copper reaction tube maintained at a temperature of about 300–320° C. Into the catchpot there is sprayed a 10% solution of ammonium phosphate in water in a quantity such that the gas stream picks up ammonium phosphate equivalent to 0.2% of the weight of methyl alcohol passing. Into the substances issuing from the reaction tube there is sprayed a 10% aqueous solution of ammonia in a quantity such that the stream of substances picks up ammonia equivalent to about 0.1% of the weight of methyl alcohol being introduced.

The products issuing from the reaction tube after this addition of ammonia are mixed with a large volume of benzene vapor then cooled to about 110° C., then the uncondensed substances are cooled separately to room temperature and finally uncondensed gases are scrubbed with acetic acid.

Having described my invention what I desire to secure by Letters Patent is:

1. In a process comprising passing carbon monoxide and the vapor of a lower aliphatic alcohol through a reaction zone in which they react in presence of a phosphoric acid catalyst dispersed in the gaseous phase and subjecting the substances issuing from the reaction zone to condensation, the step of introducing a basic nitrogen compound selected from the group consisting of ammonia, ethylamine, diethylamine and aniline into the reactants issuing from the reaction zone.

2. In a process comprising passing carbon monoxide and the vapor of a lower aliphatic alcohol through a reaction zone in which they react in presence of a phosphoric acid catalyst dispersed in the gaseous phase and subjecting the substances issuing from the reaction zone to condensation, the steps of introducing a basic nitrogen compound selected from the group consisting of ammonia, ethylamine, diethylamine and aniline into the reactants entering the reaction zone and introducing a further quantity thereof into the substances issuing from the reaction zone.

3. In a process comprising passing carbon monoxide and the vapor of a lower aliphatic alcohol through a reaction zone in which they react in presence of a phosphoric acid catalyst dispersed in the gaseous phase and subjecting the substances issuing from the reaction zone to condensation, the steps of introducing into the reactants entering the reaction zone ammonium phosphate, introducing into the substances issuing from the reaction zone a basic compound of nitrogen selected from the group consisting of ammonia, ethylamine, diethylamine and aniline, and effecting said condensation by first cooling only sufficiently to condensate any aliphatic acid anhydride present and then separately condensing more volatile substances.

4. In a process comprising passing carbon monoxide and the vapor of methyl alcohol through a reaction zone in which they react in presence of a phosphoric acid catalyst dispersed in the gaseous phase and subjecting the substances issuing from the reaction zone to condensation, the steps of introducing a basic nitrogen compound selected from the group consisting of ammonia, ethylamine, diethylamine and aniline into the reactants entering the reaction zone and introducing a further quantity thereof into the substances issuing from the reaction zone.

5. In a process comprising passing carbon monoxide and the vapor of methyl alcohol through a reaction zone in which they react in presence of a phosphoric acid catalyst dispersed in the gaseous phase and subjecting the substances issuing from the reaction zone to condensation, the steps of introducing into the reactants entering the reaction zone ammonium phosphate, introducing into the substances issuing from the reaction zone a basic compound of nitrogen selected from the group consisting of ammonia, ethylamine, diethylamine and aniline, and effecting said condensation by first cooling only sufficiently to condense any acetic anhydride present and then separately condensing more volatile substances.

HENRY DREYFUS.